United States Patent
Laarmann et al.

(10) Patent No.: US 10,328,403 B2
(45) Date of Patent: Jun. 25, 2019

(54) MUG WITH A HOLLOW PUMPING PIECE

(71) Applicants: Elmar Laarmann, Viljandimaa (EE); Aleksander Denisoff, Tallinn (EE); Marko Inno, Viljandimaa (EE); Kaur Kaldoja, Järvamaa (EE); Jalvar Usin, Pärnumaa (EE); Raido Usin, Viljandimaa (EE); Ardo Kalev, Viljandimaa (EE)

(72) Inventors: Elmar Laarmann, Viljandimaa (EE); Aleksander Denisoff, Tallinn (EE); Marko Inno, Viljandimaa (EE); Kaur Kaldoja, Järvamaa (EE); Jalvar Usin, Pärnumaa (EE); Raido Usin, Viljandimaa (EE); Ardo Kalev, Viljandimaa (EE)

( * ) Notice: Subject to any disclaimer, the term of this patent is extended or adjusted under 35 U.S.C. 154(b) by 0 days.

(21) Appl. No.: 15/532,539

(22) PCT Filed: Dec. 2, 2015

(86) PCT No.: PCT/FI2015/050843
§ 371 (c)(1),
(2) Date: Jun. 2, 2017

(87) PCT Pub. No.: WO2016/087715
PCT Pub. Date: Jun. 9, 2016

(65) Prior Publication Data
US 2017/0348656 A1    Dec. 7, 2017

(30) Foreign Application Priority Data

Dec. 2, 2014 (FI) .................................... 20140336

(51) Int. Cl.
*B01F 15/00*     (2006.01)
*B01F 5/00*      (2006.01)
(Continued)

(52) U.S. Cl.
CPC .... *B01F 15/00506* (2013.01); *A47G 19/2205* (2013.01); *A47J 43/27* (2013.01);
(Continued)

(58) Field of Classification Search
CPC .................. A47G 19/2205; A47J 43/27; B01F 15/00506; B01F 5/0065; B01F 11/0074; B01F 13/002; B01F 15/00876
See application file for complete search history.

(56) References Cited

U.S. PATENT DOCUMENTS

| 2,965,274 | A | 12/1960 | Brillis |
| 4,967,939 | A | 11/1990 | Taylor |

(Continued)

FOREIGN PATENT DOCUMENTS

| CN | 202536971 U | 11/2012 |
| CN | 203619255 | 6/2014 |

(Continued)

OTHER PUBLICATIONS

European Patent Office, Search Report, Application No. 15865080.4, dated Nov. 22, 2017, 7 pages.

(Continued)

*Primary Examiner* — Anshu Bhatia
(74) *Attorney, Agent, or Firm* — Zeigler IP Law Group, LLC

(57) ABSTRACT

A mug including a stirring unit connected to the liquid space of the mug, for stirring a beverage contained in the liquid space of the mug simultaneously by the same hand in which the mug is held, and in which mug the stirring unit includes a pumping space separate from the liquid space, and a pumping device connected to the pumping space, configured to increase and to decrease the pressure of air inside the pumping space in an alternating manner. In the mug according to the invention, a flow channel extends from the (Continued)

pumping space to the liquid space, enabling the flow of the beverage contained in the liquid space from the liquid space to the pumping space and from the pumping space to the liquid space, whereby a liquid flow can be formed in the flow channel, for stirring the beverage in the liquid space by the pumping device.

4 Claims, 3 Drawing Sheets

(51) Int. Cl.
  *B01F 11/00* (2006.01)
  *B01F 13/00* (2006.01)
  *A47G 19/22* (2006.01)
  *A47J 43/27* (2006.01)
(52) U.S. Cl.
  CPC ........ *B01F 5/0065* (2013.01); *B01F 11/0074* (2013.01); *B01F 13/002* (2013.01); *B01F 15/00876* (2013.01)

(56) References Cited

U.S. PATENT DOCUMENTS 6,471,390 B1 * 10/2002 Cuthbertson ...... A47G 19/2205
  366/101
2005/0135186 A1 6/2005 Mbakaop

FOREIGN PATENT DOCUMENTS

| CN | 203619255 U | 6/2014 |
| KR | 20100060583 A | 6/2010 |

OTHER PUBLICATIONS

International Search Report, International Application No. PCT/FI2015/050843, dated Mar. 17, 2016, 4 pages.

* cited by examiner

MUG WITH A HOLLOW PUMPING PIECE

FIELD

The invention relates to a mug.

BACKGROUND

Conventionally, for stirring a beverage in a beverage cup, such as a cup of coffee or a cup of tea, a separate stirring means is used, such as a teaspoon or, in the case of disposable cups, sometimes also e.g. a wooden stick.

A drawback in this conventional way of stirring the beverage is that both hands are always needed for doing it when the cup is held in hand. However, there are situations in which one hand is needed for something else than holding the cup or stirring the beverage in it simultaneously when drinking from the cup or holding the cup in hand. A need for keeping one hand free during drinking the beverage in the cup or holding the cup in hand occurs, for example, when driving a car or when holding another object or piece relating to drinking the beverage, such as another piece of tableware (e.g. a saucer) or a foodstuff (e.g. a slice of bread, a bun, a cookie, or the like).

At present, mugs and other drinking cups are also known, which are equipped with some kind of a stirring means that can be applied simultaneously by the same hand in which the mug or beverage cup is held. A mug, in which the beverage can be stirred simultaneously by the same hand in which the mug is held, is disclosed in e.g. U.S. Pat. No. 6,471,390 B1. In this solution, the mug is equipped with a handle comprising a pump operable by a finger to produce pressurized air which is introduced in the mug. A check valve is provided in the handle of the mug, preventing the entry of liquid into the handle but enabling the entry of air from the inside of the handle into the liquid space of the mug. In other words, flows that cause stirring are generated by means of an air flow introduced in the liquid space. As a result, the flows causing stirring are primarily air bubbles, wherein liquid flows causing actual stirring remain relatively insignificant and inefficient. Moreover, the arrangement for stirring comprises several separate elements which increases the manufacturing costs of the mug a lot compared with a conventional mug.

BRIEF SUMMARY

The aim of the invention is to introduce a novel mug which is simpler and less expensive to manufacture than before and in which the beverage can be simultaneously stirred by the same hand in which the mug is held, by means of a pumping device in the mug.

The aim of the invention is achieved by a mug according to the invention, because the mug is provided with a pumping space, into which the liquid in the mug, that is, the beverage, is sucked from the liquid space of the mug via a flow channel accelerating the liquid flow by underpressure generated by a pumping device, and from which the beverage is led by overpressure generated by the pumping device via a flow channel accelerating the flow back to the liquid space in the mug, wherein a liquid flow is generated in the beverage in the liquid space, generating significantly stronger turbulence and flows in the liquid space of the mug than merely air introduced into the liquid space. To put it more precisely, the cup according to the invention is characterized in what will be presented in the independent claim 1.

Dependent claims 2 to 9 will present some advantageous embodiments of the mug according to the invention.

The mug according to the invention has the advantage that the mug, based on a pumping device in connection with the mug, which pumping device can be used simultaneously by the same hand in which the mug is held, can be made more efficient in stirring the beverage and simpler in its structure and less expensive in its manufacturing costs than mugs of prior art where the stirring of the beverage is based on a pumping device in the mug.

DESCRIPTION OF THE DRAWINGS

In the following, the invention will be described in more detail with reference to the appended drawings, in which.

DETAILED DESCRIPTION

Figure 1:
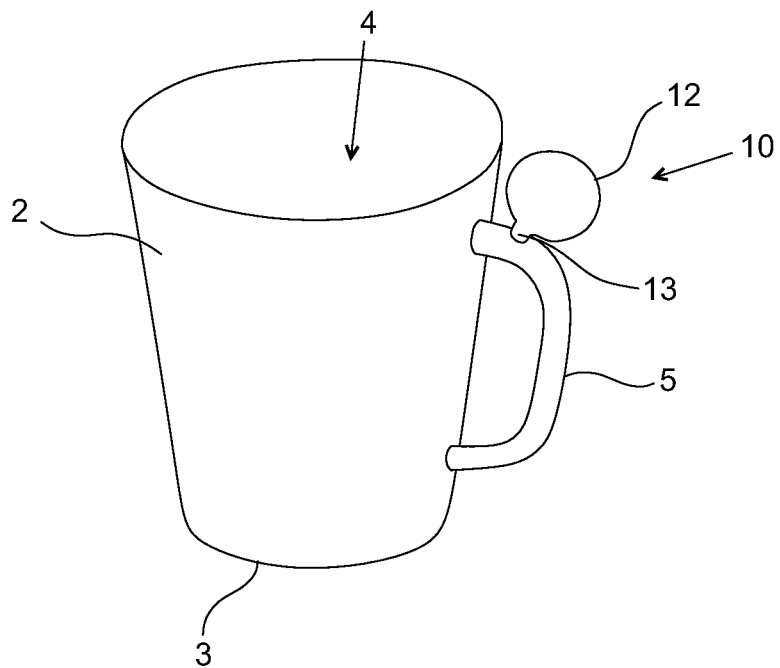
FIG. 1 shows a mug according to the invention seen in a slanted view from above.

FIGS. 1 to 4 show a mug 1 according to the invention. In this embodiment, the mug 1 has a circular cross-section; in other words, it comprises a cylindrical side wall 2 and a bottom 3 connected to the lower edge of the side wall. Delimited by the side wall 2 and the bottom 3, a liquid space 4 is formed inside them, into which space a beverage 6 to be drunk from the mug is poured when the mug 1 is used. However, the shape of the side walls and the bottom of the mug according to the invention may vary; in other words, its cross-sectional shape can also be different from circular, such as oval or angular.

In this case, the mug 1 is made by casting from a suitable castable material, such as clay, porcellaine or plastic. A handle 5 is connected to the side wall 2 of the mug 1, for gripping the mug 1 when drinking the beverage 6 from it. In this case, the handle 5 is integrated in the mug 1, but the handle 5 could be a separate piece as well.

Figure 2:
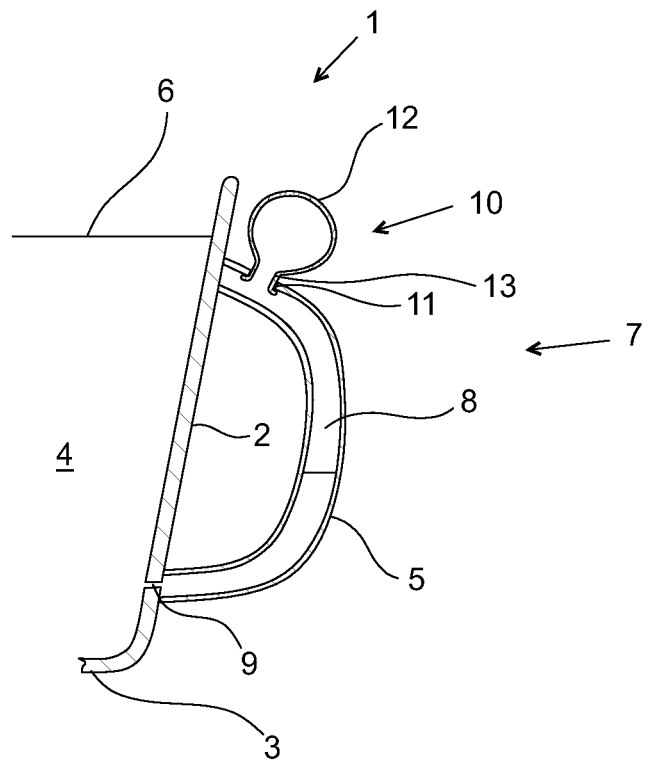
FIG. 2 shows the handle of the mug of FIG. 1, and the side wall next to the handle, seen in a cross-sectional side view.
Figure 3:
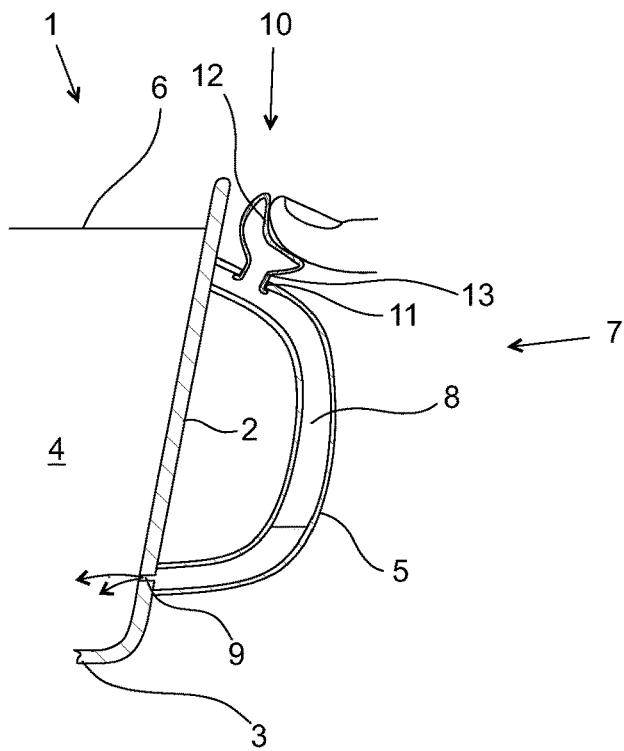
FIG. 3 shows the handle, and the side wall next to the handle, of the mug of the preceding figures, seen in a cross-sectional side view when the pumping piece of a pumping device connected to the handle is being pressed.

The mug 1 according to FIGS. 1 to 4 comprises a stirring unit 7 which, in this embodiment, is implemented in connection with the handle 5 of the mug 1. For this purpose, the handle 5 is made hollow inside so that a pumping space 8 is provided inside the handle 5, as shown in FIGS. 2 and 3.

Figure 4:
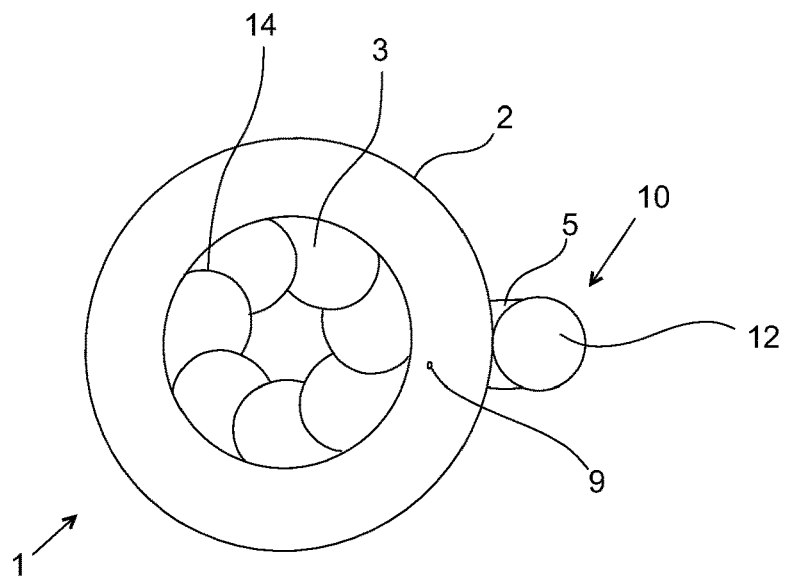
FIG. 4 shows the mug according to the preceding figures seen directly from above.

A flow channel 9 extends from the pumping space 8 to the liquid space 4 of the mug 1, via which the liquid, i.e. the beverage 6, contained in the mug can flow from the liquid space 4 to the pumping space 8 and from the pumping space 8 to the liquid space 4. The stirring unit 7 comprises a pumping device 10 which, in this case, is a hollow pumping piece 12 made of an elastic material, fastened to a connecting opening 11 in the top part of the handle 5, and provided with a connecting collar 13 to be connected to the connecting opening 11 in an air-tight way, whereby air contained in the pumping piece 12 can flow from the inside of the pumping piece 12 to the pumping space 8 inside the handle 5. In this embodiment, the stirring unit 7 also comprises whirling grooves and/or protrusions at the bottom 3 of the mug 1, on the side of the liquid space 4, as shown in FIG. 4.

In this embodiment, the pumping piece 12 is a spherical piece, hollow inside, having a wall of an elastic material. Thus, the pumping piece 12 can be compressed by a finger (in this embodiment, by the thumb), and it will resume its original shape when the compressing is discontinued. Thus, when pressing the pumping piece 12, the volume of the pumping piece 12 is decreased and air contained in it flows via the connecting collar 13 to the pumping space 8. As a result, the pressure of air in the pumping space 8 increases. In a corresponding manner, when the pressing is discontinued and the pumping piece 12 resumes its original shape, the volume of the pumping piece increases and air flows from the inside of the pumping space 8 back to the inside of the pumping piece 12. As a result, the pressure of air in the pumping space 8 decreases. In an embodiment similar to that shown in FIGS. 1 to 4, the pumping piece 12 can naturally have a shape different from spherical, for example oval, angular or elongated.

In its simplest form, the flow channel 9 is a hole between the pumping space 8 and the liquid space, having an inner diameter that is relatively small in relation to the inner diameters of the pumping space 8 and the liquid space 4. In the embodiment of FIGS. 1 to 4, the flow channel 9 extends from the pumping space 8 inside the handle 5 diagonally into the liquid space 4 so that its opening on the side of the liquid space 4 faces the inner direction of the side wall 2 of the cylindrical liquid space 4 in the plane parallel to the plane formed by the bottom of the mug (that is, in the direction of the perimeter of the circular bottom), whereby the flow generated by the flow channel 9 tends to make the beverage 6 contained in the liquid space whirl inside the mug 1. Nevertheless, it should be noted that the flow channel 9 could be oriented in another desired direction as well. In the present case, however, the direction of the flow channel 9 is selected in this way because it has been found that the direction and the whirling grooves and/or protrusions 14 in the surface of the bottom 3 on the side of the liquid space 4 have a strong combined effect enhancing the stirring of the liquid 6.

When using the mug 1 according to FIGS. 1 to 4, the beverage contained in the mug 1 can be stirred by pressing the pumping piece 12 with a thumb. When pressing the pumping piece 12, the pumping piece 12 is compressed, whereby part of the air contained in it flows from the inside of the pumping piece 12 via the connecting collar 13 and the connecting opening 11 to the pumping space 8. As a result, the pressure of the air in the pumping space 8 becomes higher than in the equilibrium state of the initial situation. Because the pumping space 8 contains hardly any liquid (i.e. beverage 6 contained in the mug) before the pumping is started, the air entering the pumping space 8 from the pumping piece 12 during the first pressing will flow (mostly) via the flow channel 9 to the liquid space 4. When entering the liquid space 4, the air will form air bubbles which will rise to the surface of the beverage in the liquid space 4, from which surface the air will exit the mug 1. When the pumping piece 12 is subsequently released, it will resume its original shape, whereby its volume will increase and it will thus suck part of the air contained in the pumping space 8. As a result, an underpressure will develop inside the pumping space 8. The resulted underpressure will cause the beverage 6 in the liquid space 4 to flow via the flow channel 9 to the pumping space 8, and the pressure in the pumping space 8 will return to approximately the same level as it was before the pumping was started, with the exception that the pumping space 8 now contains an amount of the beverage 6 from the liquid space 4 that corresponds to the amount of air that was removed when the pumping piece was pressed for the first time. When the pumping piece 12 is pressed for a second time, the overpressure formed in the pumping space 8 will push the beverage from the pumping space 8 via the flow channel 9 into the liquid space 4. As a result, flows and whirls are generated in the beverage contained in the liquid space 4, stirring the beverage in the liquid space 4. The whirling grooves and/or protrusions 14 in the bottom of the mug 1 on the side of the liquid space 4 increase the generation of whirls and thereby enhance the stirring of the beverage 6. Pressing after the second pressing time will have the same effect as the second pressing time; in other words, when the pumping piece 12 resumes its original shape, beverage will be drawn from the liquid space 4 of the mug 1 to the pumping space 8, and pressing of the pumping piece 12 will push it via the flow channel 9 back to the liquid space 4. Thus, pressing of the pumping piece 12 after the first time will result in the above-described flowing and whirling of the beverage 6 each time the pumping piece 12 is pressed or released. The resulting flow of the beverage 6 from the pumping space 8 to the liquid space 4 and back will thus stir the beverage 6 very efficiently, and this stirring can always be done, when needed, by the same hand in which the mug 1 is being held.

Figure 5:
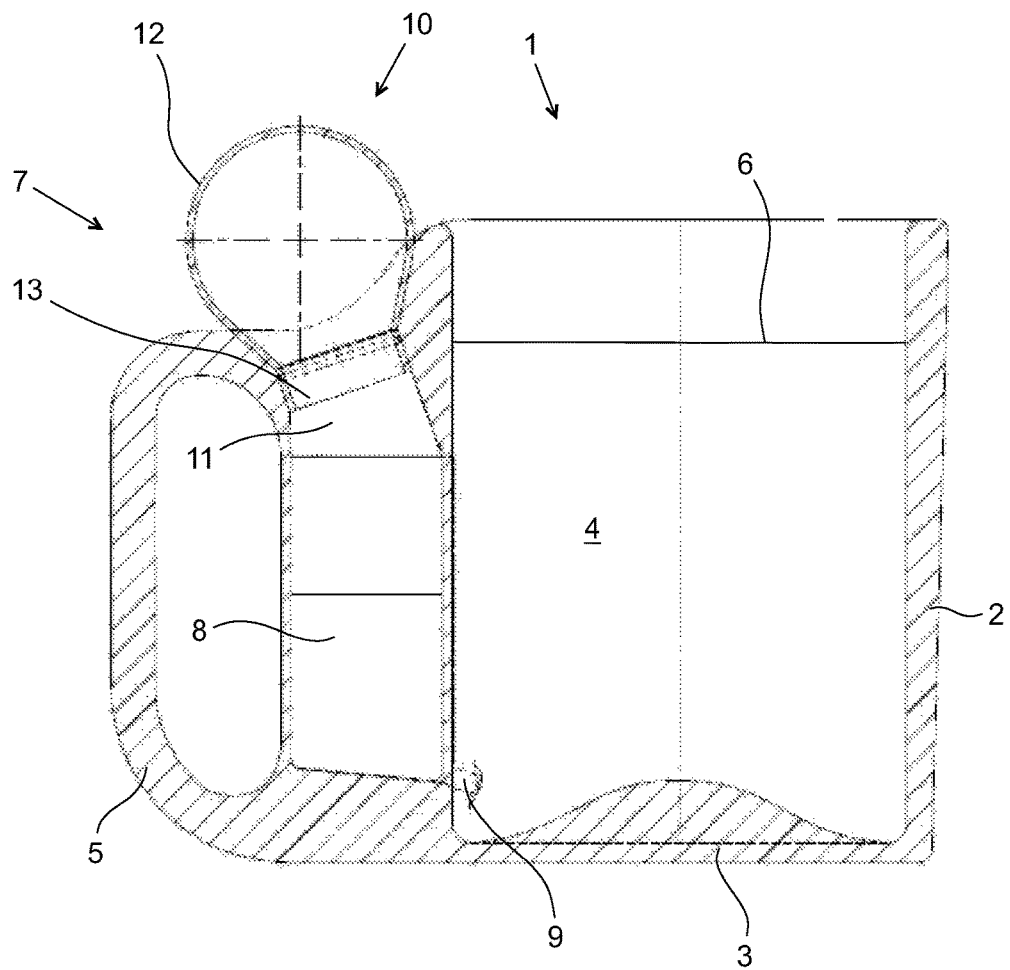
FIG. 5 shows the vertical cross-section of another mug according to the invention, seen in a side view.

FIG. 5 shows another mug 1 according to the invention. In this embodiment, the stirring unit 7 is in the mug 1, between its handle 5 and side wall 2, as shown in FIG. 5. In this case, too, the stirring unit 7 comprises a pumping device 8, a pumping space 8, and a flow channel 9 extending from the pumping space to the liquid space 4 of the mug 1. Also in this embodiment of the mug according to the invention, whirling grooves and/or protrusions can be provided in the bottom 3 of the mug, on the surface on the side of the liquid space 4, to enhance the stirring of the beverage 6. Thus, the principle of operation of the mug 1 of FIG. 5 is, in practice, completely the same as the principle of operation of the mug 1 according to FIGS. 1 to 4, and the only difference is the location of the pumping chamber 8.

Further, the mug according to the invention can be implemented in a variety of ways different from the example embodiments presented above. In an embodiment of the mug according to the invention, the pumping space is formed inside the bottom or the side wall of the mug. In such a mug, the pumping piece can be formed in the mug, for example, in such a way that it is a cushion enveloping the mug in part or in whole, whereby it can be compressed by squeezing the mug more strongly and more lightly in an alternating manner. Thus, such an embodiment is suitable for a mug with no handle. On the other hand, such an embodiment can be provided in a mug with a handle as well, whereby in this case, too, the pumping piece can be provided e.g. in the wall of the mug, but alternatively, it can be provided e.g. in the handle, as in the embodiment of FIGS. 1 to 4, or in such a way that the handle forms the pumping piece. Thus, the pumping piece can be pressed, in the same way as in the embodiment of FIGS. 1 to 4, by the thumb of the hand in which the mug is held, or by squeezing the handle (if the handle constitutes the pumping piece). The advantage of the pumping space formed inside the wall or the bottom of the mug is that there can be several flow channels extending from the pumping space to the liquid space in different parts of the mug, whereby flows of the beverage can also be formed more evenly in different parts of the liquid space inside the mug. In an embodiment of the mug according to the invention, the stirring unit can also be completely separate from the side wall, the bottom or the handle of the mug. Thus, the stirring unit can be fastened to the mug in a detachable way, so that the stirring unit, the side wall, or the handle of the mug can be provided with a suitable fastening member, by which the stirring unit that is totally separate from the rest of the mug can be fastened to the mug 1. Furthermore, in an embodiment of the mug according to the invention, the pumping device that forms the stirring unit may comprise, not a pumping piece but an electrical pump configured to pump liquid from the pumping space to the liquid space and back to the pumping space, when an actuating switch provided e.g. on the outer wall or the handle of the mug is pressed down. In such an embodiment, the electrical pump can be e.g. any suitable electrical pump, such as a diaphragm pump or an impeller pump. Alternatively, the electrical pump can be formed of e.g. a flexible membrane which is moved by one or more electric magnets so that the function of the membranecorresponds to that of the above described pumping piece to be pressed by a finger or squeezed by a hand. The power source of the mug equipped with an electric pump is a battery or a rechargeable battery. The mug can also comprise an electronic control unit for controlling the electric motor or electric magnets that actuate the pump (by switching the voltage to the electric magnets on and off in an alternating manner) so that when the actuating switch is on, the electric pump makes the beverage flow from the pumping space of the mug to the liquid space and back from the liquid space to the pumping space in the above described way.

Thus, the mug according to the present disclosure is not limited to the above described example embodiments, but it can be implemented in a variety of ways within the scope of the appended claims.

The invention claimed is:

1. A mug, the mug comprising a stirring unit connected to a liquid space of the mug, for stirring a beverage contained in the liquid space of the mug simultaneously by the same hand in which the mug is held, and in which mug the stirring unit comprises a pumping space separate from the liquid space, and a pumping device connected to the pumping space, configured to increase and to decrease the pressure of air inside the pumping space in an alternating manner, and wherein a flow channel extends from the pumping space to the liquid space, enabling the flow of the beverage contained in the liquid space from the liquid space to the pumping space and from the pumping space to the liquid space, whereby a liquid flow can be formed in the flow channel, for stirring the beverage in the liquid space by the pumping device, and wherein the pumping space is provided in or more of a handle of the mug or between the handle of the mug and the sidewall, wherein the pumping device of stirring unit comprises a hollow pumping piece made of an elastic material, fastened to a connecting opening in the top part of the handle and provided with a connecting collar configured to be connected to the connecting opening in an air-tight way, whereby air contained in the pumping piece can flow from inside of the pumping piece to the pumping space inside the handle.

2. The mug according to claim 1, wherein one end of the flow channel is oriented towards the liquid space so that a direction of flow of the beverage flowing from the pumping space to the liquid space out of the one end of the flow channel is along a plane that is parallel with a bottom of the mug, and a direction of flow of the beverage in a middle portion of the flow channel is parallel with at least one side wall of the mug.

3. The mug according to claim 1, wherein at least one wall of the mug on the side of the liquid space is provided with at least one protrusion or recess generating whirls in the beverage contained in the liquid space.

4. The mug according to claim 3, wherein the protrusion or recess is in the bottom of the mug on the side of the liquid space.

\* \* \* \* \*